Aug. 29, 1967   E. A. MEYER   3,338,127
ONE PIECE DEFORMABLE FASTENER
Filed Aug. 9, 1965   2 Sheets-Sheet 1
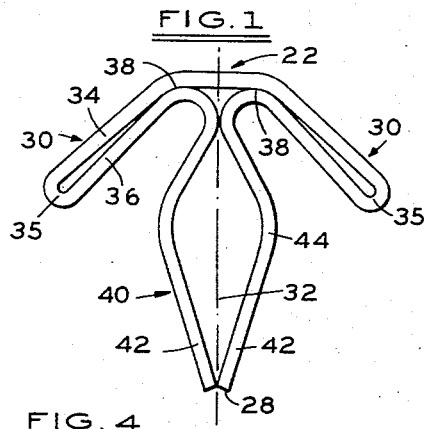
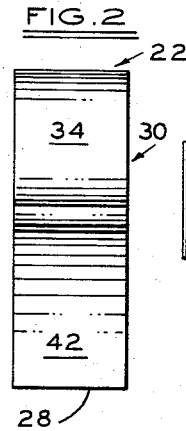
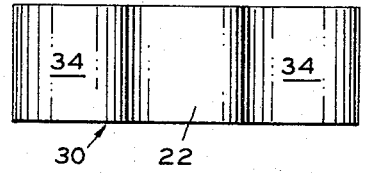
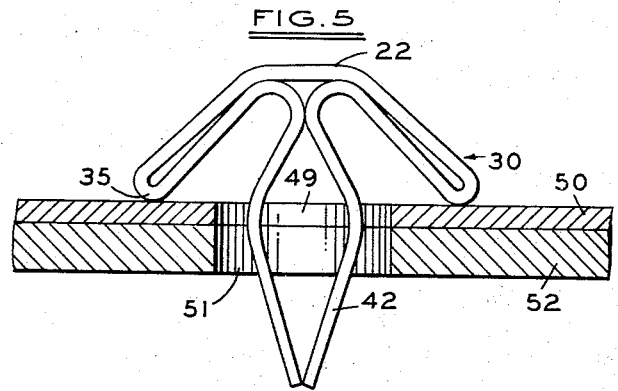
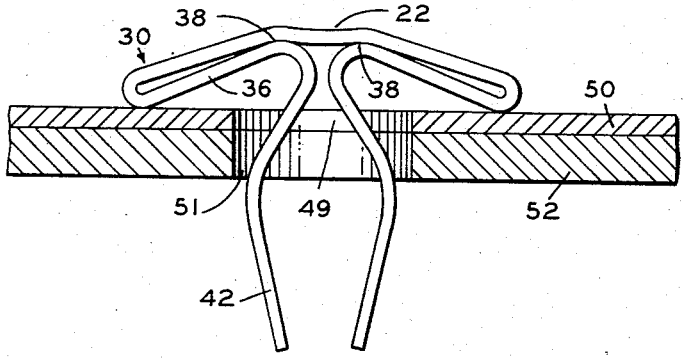
INVENTOR.
ENGELBERT A. MEYER
BY
*Burton & Parker*
ATTORNEYS Aug. 29, 1967     E. A. MEYER     3,338,127
ONE PIECE DEFORMABLE FASTENER
Filed Aug. 9, 1965     2 Sheets-Sheet 2
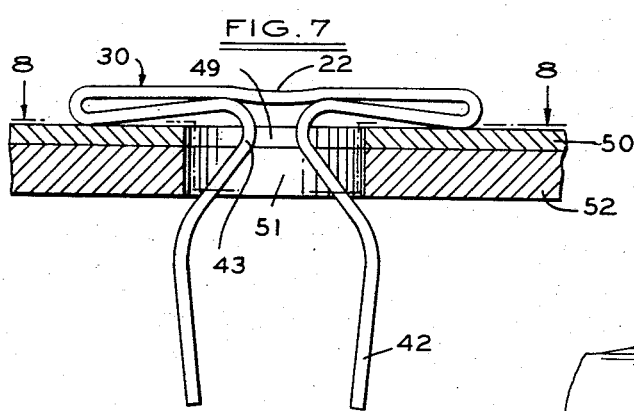
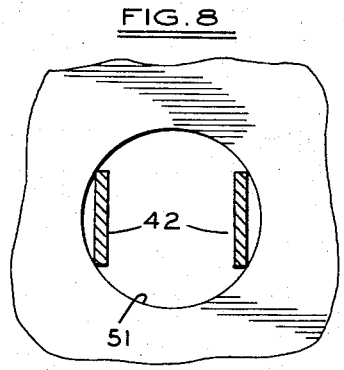
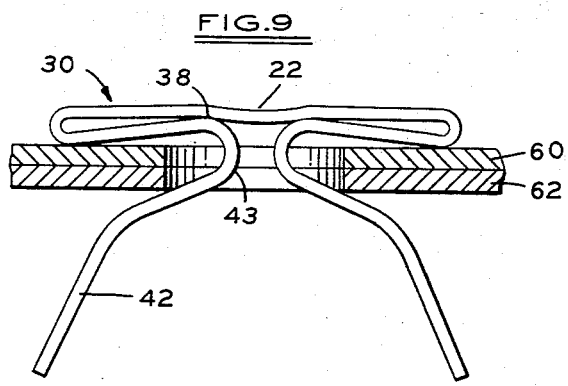
INVENTOR.
ENGELBERT A. MEYER
BY
*Burton & Parker*
ATTORNEYS United States Patent Office 3,338,127
Patented Aug. 29, 1967

3,338,127
ONE PIECE DEFORMABLE FASTENER
Engelbert A. Meyer, Union Lake, Mich., assignor to Chicago United Products Company, Inc., Detroit, Mich., a corporation of Michigan
Filed Aug. 9, 1965, Ser. No. 478,299
2 Claims. (Cl. 85—38)

This invention relates generally to fastening devices of the type referred to as blind fasteners. The blind fastener of this invention is particularly, although not exclusively adapted for use in securing panels in tension.

Previous structures of this type do not adequately tension the panels to be secured together, and are therefore not satisfactory for many securement applications. Many of the conventional blind fasteners are subject to being driven through the panel apertures or distorted out of tensioned engagement with the panels.

Another problem with conventional blind fasteners is the expense of manufacturing their relatively complex structures. These fasteners are provided with notches or raised portions which must be stamped from blanks. The stampings are then formed into relatively complex fasteners having several sharp bends and radii. These bends and notches may weaken the structure of the fastener, and thereby prevent an adequate securement.

Another problem with the conventional fastener of this type involves the method of securement. The previous fasteners of this type were required to deform at several locations on the fasteners to form enlarged sections and radii which were designed to tension against the panels secured. The precise location of these deformations varied with each fastener installation, and the quality of the securement likewise varied.

Another problem with many of the previous fasteners of this type is their inability to adequately secure various widths of panels. In consequence many manufacturers were forced to stock and supply several fastener designs and sizes to accommodate different panel thicknesses.

Briefly the fastener of this invention is formed from a continuous strip of sheet material, which may be of a constant width, into a generally T-shaped configuration. The ends of the strip define the base of the T. The arms of the T slope downwardly to define an acute angle with the axis of the body portion, and the legs are bowed outwardly near their mid portion to define a generally diamond shape therebetween.

An object of this invention is to provide a fastener which will securely tension the panels into a substantially unitary structure, and which is adequate for all fastener applications.

Another object of this invention is to provide a blind fastener which may be hammer driven into securement without the hazard of driving the fastener through the panel apertures, or deforming the fastener out of tensioned engagement with the panels.

Another object of the fastener of this invention is to provide a fastener which may be formed from a strip of stock material having a constant width, thereby eliminating the need for stamping operations.

Another object of this invention is to provide a fastener of the type described which is capable of securing panels of greatly varying widths without sacrificing the uniformity of the securement, or its structural integrity.

A further object of this invention is to provide a blind fastener whose legs do not deform during the securement operation, but rather the fastener is deformed about predetermined axes to insure constant and uniform securements.

Another object of this invention is to provide a fastener which has a minimum of sharp bends and radii to insure structural integrity.

Other objects, advantages, and meritorious features of this invention will more fully appear from the following specification, claims and accompanying drawings, wherein:

FIG. 1 is a front elevation of one embodiment of my invention;

FIG. 2 is a side elevation of the embodiment of my invention shown in FIG. 1;

FIG. 3 is a top view of FIG. 1;

FIG. 4 is a strip of sheet stock used to form the embodiment of my invention shown in FIGS. 1 to 3;

FIG. 5 is the embodiment of my invention shown in FIGS. 1 to 3 disposed for securement in apertures formed in aligned panels shown in cross section;

FIG. 6 shows the fastener of FIG. 5 partially impact driven into securement of the panel;

FIG. 7 shows the fastener of FIGS. 5 and 6 after securement;

FIG. 8 is a cross sectional view of FIG. 7 in the direction of view arrows 8—8;

FIG. 9 shows the embodiment of my invention securing thinner panel members.

Referring to FIGS. 1 to 4, it can be seen that this embodiment of my invention is formed from a strip of sheet material, shown in FIG. 4, having a uniform width. The head of the fastener, shown generally at 22, is formed from the mid portion of the strip 24, and the ends of the strip are formed to define the base of the fastener 28.

It can be seen from FIG. 1, that the fastener of this invention defines a generally T-shaped configuration. The head 22 has a pair of oppositely disposed reversely folded arms, indicated generally at 30, which define an acute angle with the axis of the base portion 32, and the base axis 32 passes through the midpoint on the strip.

The head portion 22 with the upper portion of the arms 34 define a generally channel-shaped section. The lower portion of the arms 36 is folded inwardly to engage the inside of this channel section at 38, which will be referred to hereinafter as the axis of deformation.

The base portion of the fastener, referred to generally at 40, has a pair of legs 42, which are bowed outwardly near their mid portion, at 44, to define a generally diamond shape therebetween. The fastener ends 28, of this embodiment of my invention, contact each other, or nearly contact, to define a pointed end. This structure allows the fastener to be used to secure less rigid panels, such as fibreboard or cardboard, or nonrigid panels, such as cloth, to relatively rigid panels without providing an aperture in the less rigid or nonrigid panels. The pointed end of the fastener may be pushed through these materials to form its own aperture. This structure also allows the fastener to be more easily secured in misregistered apertures between rigid panels. The lower portion of the legs 42 will contact the misaligned aperture wall to compress the legs, and allow the legs to pass through the restricted opening. However, this feature is not considered essential to the inventive concept of my invention.

Referring to Figs 5 to 8, wherein the fastener embodiment of FIGS. 1 to 4 is shown during stages of securing a relatively thin panel 50, and a thicker panel 52. In these views the fastener has been disposed in the aligned panel apertures 49 and 51, respectively, and is being impacted by a hammer, or other impacting means, to tension the panels together.

In FIG. 5 the fastener has not been deformed. The distal ends 35 of the arm 30 engage the surface of the upper panel 50. In FIG. 6 impacting has begun on the fastener head 22, bowing the head slightly inward. The arms 30 have begun to spread, with the deformation pivoting about the axis of deformation 38. This pivotal movement of the arms is translated to the legs 42 to cause them to curl upward toward the panels without deformation.

In FIG. 7 the securement has been completed, and the arms 30 have been fully extended to lie nearly flat across the panel surface. The deformation of the arms has caused the legs to curl upward to engage the lower portion of the panel 52, where they had been spring tensioned about the curved portion 43 to tension the panels in engagement. The legs 42 have not been permanently deformed, but rather have been resiliently tensioned against the lower panel 52. The bowed deformation of the head 22 acts as a lock to prevent the legs from retracting to the closed position. FIG. 8 is a cross sectional view of FIG. 7, along view arrows 8—8, which shows the point contact of the legs 42 with the panel apertures 49 and 51.

FIG. 9 is similar to FIG. 7, except that the combined thicknesses of the panels secured, 60 and 62, is less than shown in FIG. 7. It can be seen from FIG. 9 that the fastener of my invention is equally adaptable to securing panels of varying thicknesses.

The fastener of FIG. 9 is identical to the fastener shown in the previous figures, and is numbered accordingly. The legs 42 have curled further about the axis of deformation 38 because the panels presented no resistance to their movement. However, when engagement was reached, the legs 42 were tensioned against the panel 62 about the curved leg portion 43.

It is understood that certain modifications may be made to the fastener of this invention without departing from the purview of the appended claims. For example, notches may be provided to weaken the fastener head near the axis of deformation 38, however, this would result in increased cost, which it is a purpose of this invention to minimize.

What is claimed is:

1. A blind fastener comprising: a continuous strip of resilient sheet material folded to provide a head portion and a body portion generally symmetrical about a common axis, said head portion having a generally flat top substantially normal to and symmetrically disposed about said common axis and a pair of oppositely disposed downwardly and outwardly extending arms defining an acute angle with said common axis, said arms reversely folded upon themselves to engage the underside of said head portion near said common axis and at the juncture of said arm and said generally flat top forming thereby a fulcrum, said body portion being an extension of said arms and having a pair of legs extending substantially parallel to but bowed outwardly from said common axis with maximum divergence of said legs being substantially in a plane containing the lower ends of said outwardly extending arms of said head, and the upper portion of said bowed out legs defining with said arms a pair of downwardly and outwardly extending panel margin receiving channels having a width less than the effective thickness of the panel as measured between points of contact of the channels defined by said head portion and said body portion and opposite surfaces of the panel, said head upon being impacted toward a panel flattening to cause curling of the aforesaid channels over opposite margins of a panel aperture through which the legs project with such channels yieldingly opening to accommodate the effective thickness of the panel and disposed in tensioned engagement with the opposite surface of the panel adjacent said margins of the panel.

2. The blind fastener defined in claim 1, characterized in that said legs slope inwardly adjacent their ends to define a closed diamond therebetween reinforcing said outwardly sloping portion of said legs, and providing a penetrating pointed end for said fastener.

References Cited

UNITED STATES PATENTS

| | | | |
|---|---|---|---|
| 1,336,162 | 4/1920 | Royer et al. | 85—37 |
| 1,925,488 | 9/1933 | Kern | 85—38 |
| 2,611,166 | 9/1952 | Wiley | 85—37 |
| 2,685,721 | 8/1954 | Eves | 85—37 |
| 2,797,607 | 7/1957 | Blaski | 85—38 |
| 2,912,734 | 11/1959 | Becker | 85—37 |
| 2,913,952 | 11/1959 | Becker | 85—38 |

FOREIGN PATENTS

| | | |
|---|---|---|
| 567,091 | 12/1958 | Canada. |
| 811,638 | 8/1951 | Germany. |

CARL W. TOMLIN, *Primary Examiner.*

M. PARSONS, Jr., *Assistant Examiner.*